Oct. 7, 1958 P. S. MACGREGOR 2,855,223
SELF-ENGAGING AND SELF-SEALING PIPE COUPLINGS ESPECIALLY
APPLICABLE TO FLIGHT REFUELLING PURPOSES
Filed July 21, 1955 2 Sheets-Sheet 2

Peter S. Macgregor
INVENTOR
BY Watson, Cole, Grindle & Watson
ATTORNEYS

# United States Patent Office 2,855,223
Patented Oct. 7, 1958

2,855,223

SELF-ENGAGING AND SELF-SEALING PIPE COUPLINGS ESPECIALLY APPLICABLE TO FLIGHT REFUELLING PURPOSES

Peter Stevens Macgregor, Upton, Poole, England, assignor to Flight Refueling Incorporated, Danbury, Conn., a corporation of Delaware Application July 21, 1955, Serial No. 523,513

Claims priority, application Great Britain July 22, 1954

5 Claims. (Cl. 284—18)

This invention relates to a self-engaging self-sealing plug-and-socket type pipe-coupling of the kind in which the plug member, constituted by a nozzle, is provided with a valve, which seals the opening of the nozzle when the coupling is disconnected and which is opened automatically on bringing the nozzle and socket member into coupling engagement.

This application is a continuation-in-part of my copending application Serial No. 311,402, filed September 25, 1952, now United States Patent 2,728,590, granted December 27, 1955.

An object of the invention is an improved automatically operable valve for such a coupling.

Another object is an improved coupling nozzle and valve which will substantially eliminate spillage from the coupling if parted while still filled with liquid.

Pipe-couplings of the type herein referred to are especially applicable to flight-refuelling installations of the kind in which one of the coupling members is mounted on the end of a flexible hose or the like trailed by one aircraft and the complementary coupling member is mounted on another aircraft in a forwardly facing position, the coupling being provided with spring-loaded latching means, which, when the coupling members are forcibly thrust into mutual engagement, latch them resiliently to one another, but permit the members to separate when subjected to a supercritical tension.

In such an installation, spillage of liquid on separation of the coupling members while still filled with liquid is not only inconvenient, but dangerous on account of the fire hazard associated with inflammable liquid fuel.

A further object of the invention is the provision of means for precluding any build-up of pressure between the nozzle-valve and a co-operating valve in the socket when the coupling members are brought into mutual engagement.

The following description with reference to the accompanying drawings of a typical coupling according to the invention is given by way of example only without implied limitation of the scope of the invention, which is defined in the appended claims.

Figure 1:
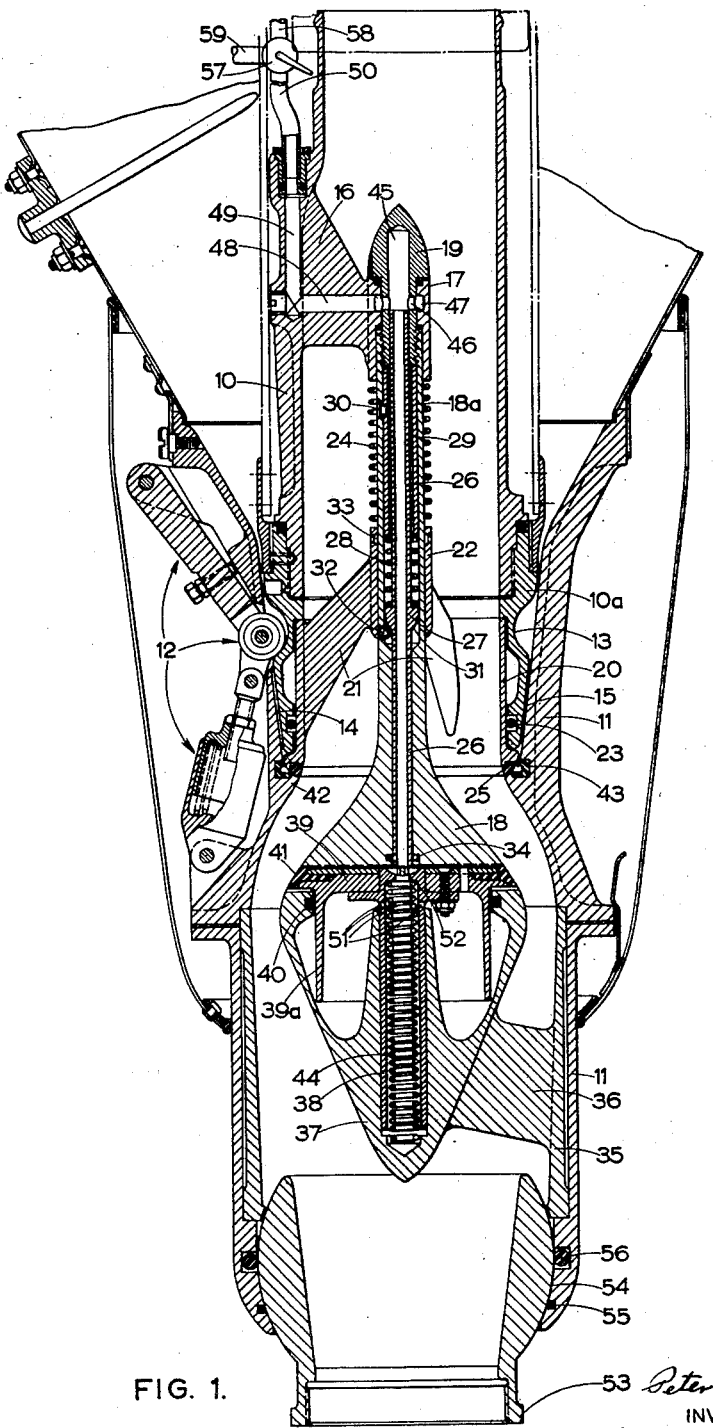
Figure 1 is an axial section of the complete coupling in engaged position.

Referring to the drawings, the plug part of the coupling comprises a nozzle body 10, to which is secured in a fluid-tight manner a nozzle extension 10a, and the socket part of the coupling comprises a socket body 11, on which is mounted a spring-loaded latching mechanism 12, similar to that described and illustrated in the specification of United States Patent No. 2,692,102, such mechanism being resiliently engageable, on thrusting the nozzle into the socket, with an annular groove 13 formed in the nozzle extension 10a. The nozzle extension 10a has an external tapered profile 14 which, when the latching mechanism 12 engages the groove 13, meets a complementary internal tapered profile formed in the socket body 11. Integrally cast with the nozzle body 10 is a radial internal web 16 terminating in a central boss 17 which is bored coaxially with the nozzle to receive the stem 18a of a valve member 18 and a plug 19 which is screwed into the end of the valve stem 18a to secure it in the boss 17.

Axially slidable in the nozzle is a sleeve member constituted by a casting comprising a sleeve 20 which is slidably mounted in the nozzle extension 10a, radial webs 21 and a central sleeve 22 which slides on the stem 18a of the valve 18. A sealing ring 23 ensures a fluid-tight joint between the sleeve 20 and nozzle extension 10a. Between the central sleeve 22 and the boss 17 is trapped a compression spring 24 which urges the assembly 20, 21, 22 outwards, i. e. to the left in Figures 1 and 2. When the nozzle is separated from the socket the sleeve member 20, 21, 22 occupies the position shown in Figure 2 in which a sealing ring 25 on the extremity of the sleeve 20 meets the inner face of the margin of the valve 18 and forms a fluid-tight joint with it.

Figure 2:
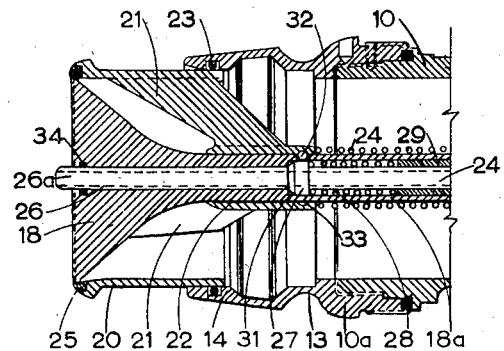
Figure 2 is a fragmentary axial section of the plug-member.

The valve 18, 18a is axially bored to receive a slidable latching member 26 having a portion 27 of enlarged diameter, between which and an abutment sleeve 29 secured to the valve stem 18a by a set screw 30 is trapped a compression spring 28, which urges the latching members 26 outwards, i. e. to the left as in Figures 1 and 2. The opposite face 31 of the enlargement 27 to that engaged with the spring 28 is of conical shape, and when the latching member 26 is displaced to the left into the position shown in Figure 2, displaces a ball detent 32, which is trapped in a radial opening in the valve stem 18a, radially outwards to engage an internal annular groove 33 formed in the sleeve 22, thus locking the assembly 20, 21, 22 in the position shown in Figure 2. A sealing ring 34 ensures a fluid-tight joint between the valve 18 and the latching member 26, which, in the position shown in Figure 2, projects from the face of the valve 18.

Figure 3:
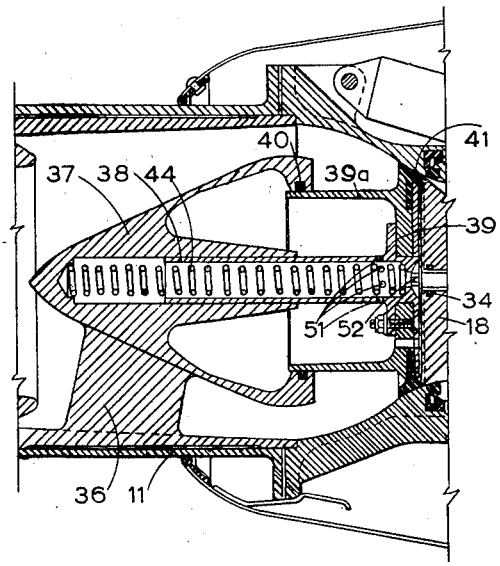
Figure 3 is a fragmentary axial section of the socket member.

Within the socket body 11 is disposed a casting comprising a sleeve 35, axially located by shoulders on the socket body, an integral web 36 and a central streamlined valve housing 37, which is bored coaxially with the socket to receive, slidably, the stem 38 of a valve member 39 whose skirt 39a slides in an opening of the valve housing 37 provided with an annular seal 40 making a fluid-tight joint with the skirt 39a. The valve 39 carries an annular seal 41 adapted to make a fluid-tight joint on one face of an annular internal rib 42 formed on the socket body 11 (see Figure 3), the opposite face of which rib affords a seating for the extremity of the sleeve 20 (see Figure 1), a fluid-tight joint between these parts being ensured by means of the annular sealing ring 25 already mentioned and an annular seal 43 disposed in a recess of the socket body 11. The valve stem 38 is hollow and encloses a compression spring 44 trapped between the housing 37 and a shoulder on the valve stem 38, which spring urges the valve 39, 39a outwards, i. e. to the right in Figures 1 and 3, and causes this valve to seat on the rib 42 when the socket and nozzle are separated.

The structure so far described is equivalent to that described in my United States Patent 2,728,590, granted December 27, 1955, from which it differs only in points of detail design not affecting the essential combination of structural elements and their mode of operation. The preceding description is therefore substantially applicable to the disclosure of my said patent.

The latching member 26 is tubular, its normally projecting end 26a being open and its opposite end being likewise open for communication with a blind boring 45 in the plug 19, which boring communicates, by means of radial passages 46, with an annular recess 47 in the boss 17, such annular recess communicating, by means of a gallery 48, 49 drilled in the web 16 and nozzle body 10, with a pipe 50 which is led to a conveniently situated atmospheric vent.

The space within the valve housing 37 enclosed by the valve 39 is vented to the interior of the hollow valve stem 38 by means of openings 51 and the interior of the valve stem 38 is vented through an opening 52 centrally situated in the face of the valve 39.

The embodiment illustrated is adapted for use in the flight-refuelling of aircraft, for which purpose the socket body 11 is connected, by means of a ball and socket joint 54, provided with fluid-tight seals 55, 56, to a fitting 53 adapted to be secured to the end of a flexible hose trailed from an aircraft; and the plug-member 10, 10a of the coupling is mounted in a forwardly facing position on another aircraft. In these circumstances the vent pipe 50 may be connected to the existing venting system of the aircraft or to any suitable venting point, which is not subjected to ram pressure when the aircraft is in flight.

In an aircraft installation, the vent pipe 50 and hollow latching member 26 may also be used for supplying de-icing fluid to the exposed face of the valve 18, for which purpose a remotely controlled cock 57 enables the pipe 50 to be connected alternatively to the atmospheric vent by means of a pipe 58, or to a source of de-icing fluid by means of a pipe 59.

The operation of the described structure is as follows:

When the nozzle is separated from the socket its parts are in the position shown in Figure 2, the sliding sleeve member 20, 21, 22 being locked in the position shown by engagement of the enlarged portion 27 of the latching member 26 with the ball 32 so that the latter is locked in the groove 33 in the sleeve 22. In this position the interior of the nozzle is sealed by engagement of the sealing ring 25 at the extremity of the sleeve 20 with the valve 18.

On inserting the nozzle into the socket the projecting end of the latching member 26 first meets the face of the obstruction constituted by the valve 39 in the socket, and as the nozzle advances the latching member 26 is pressed inwards (to the right in Figures 1 and 2) against the resistance of spring 28, thus releasing the ball 32 from the groove 33 and unlocking the sliding sleeve member 20, 21, 22. The extremity of the sleeve 20 then meets the internal rib 42 of the socket body with which it makes a fluid-tight joint by means of the sealing ring 25 and annular seal 43 and further advance of the nozzle causes the sleeve member 20, 21, 22 to be pressed inwards, i. e. to the right in Figures 1 and 2, relatively to the nozzle body against resistance of spring 24, thus exposing an annular gap between the sleeve 20 and the valve 18 which, at the same time, presses the valve member 39 inwards, i. e. to the left in Figure 1, against resistance of spring 44, to expose a corresponding annular gap between the valve member 39 and the socket body 11. When the nozzle has advanced until its tapered profile 14 meets the internally tapered profile 15 of the socket body 11, the latching mechanism 12 engages the annular groove 13 and holds the coupling resiliently in engagement, in the position illustrated in Figure 1. In this position the sleeve member 20, 21, 22 has been pressed into the nozzle as far as it will go and the external contour of the extremity of sleeve 20, which constitutes the tip of the nozzle, forms a smooth continuation of that of the tapered portion 14 of the nozzle extension 10a.

The operation as so far described is equally applicable to the disclosure of my said U. S. Patent 2,728,590.

When the face of the valve 18 of the nozzle meets the face of the valve member 39 of the socket and seats upon the annular seal 41, making a fluid-tight joint, build-up of pressure between these valve faces and within the cavities of the socket valve assembly 37, 38, 39 is prevented by the venting of these cavities and of the narrow clearance remaining between the valve faces owing to the fact that the annular seal 41 stands slightly proud of the face of the valve member 39, through the interior of the latching member 26, the blind bore 45, passages 46, annular recess 47 and galleries 48, 49 to the vent pipe 50.

I claim:

1. A plug and socket type fluid coupling comprising a generally cylindrical axially forwardly opening plug, and a socket member having a rearwardly opening recess for axial reception of said plug, said socket member being formed with a forwardly disposed annular valve seat around its said recess, a valve housing in said socket member opening axially toward said seat, a valve member axially slideably disposed in said housing for cooperation with said seat, said housing and valve member together defining a completely enclosed variable cavity, a valve fixedly carried by said plug in advance thereof for abutting engagement with said valve member to unseat the latter incident to coaxial reception of the plug in said socket member, said valve and said valve member having relatively axially registering communicating vent openings communicating with said cavity and adapted jointly to conduct fluid from said cavity incident to unseating of the valve member, and conduit means extending through said housing and said valve and establishing communication between said vent openings and the atmosphere.

2. The combination of claim 1 including a sleeve axially slideably disposed in said plug rearwardly of the valve for movement to and from seating engagement with said valve, means resiliently urging said sleeve into seating relation with the valve, a sealing ring of greater diameter than the valve carried by said sleeve for abutting sealing engagement with said socket member, whereby coupling of the socket member and plug will unseat said sleeve from the valve.

3. The combination of claim 2 including latch means normally retaining said sleeve in seating relation with said valve, an axially slideable tube defining said vent opening in the valve, said tube projecting forwardly from the valve for abutting engagement with said valve member around the vent opening therein, and for rearward movement incident to such engagement, and latch releasing means carried by the said tube for releasing said latch means responsive to rearward movement of said tube.

4. A plug and socket type fluid coupling comprising a generally cylindrical, axially forwardly opening nozzle, a valve stem fixedly coaxially supported in said nozzle and projecting forwardly through the opening thereof, a valve carried by said stem exteriorly of said nozzle and in axially spaced relation to said opening to leave an annular gap between said valve and the nozzle, a sleeve axially slideable on said stem to and from seating relation with said valve, said sleeve being formed with a latching groove, a radially movable latching detent carried by said stem for operative latching engagement in said groove, to maintain said sleeve in seated relation with said valve, said stem and said valve having an axial bore opening forwardly through said valve, and means in said nozzle defining a fluid passage communicating rearwardly with said bore, a tubular latching member axially slideably disposed in said bore in communication with said fluid passage, said member normally projecting axially forwardly through said valve, and spring means normally maintaining said member in its axially projected position, said member being retractable against said spring incident to coupling of said nozzle to a cooperating socket member, means carried by said latching member for actuating said latching detent to maintain said sleeve in its said seated relation in the projected position of said latching member and to release said latching detent incident to retractive movement of said latch member.

5. The combination of claim 4 comprising a generally cylindrical socket member opening rearwardly for coaxial reception of said nozzle, said member being formed with an internally forwardly directed valve seat, a valve housing in said socket member opening toward said seat, a valve member telescopically disposed in said housing for axial movement into engagement with said seat, said housing and valve member together defining a variable sized cavity, spring means in said cavity urging said valve member toward said seat, said valve member having an axial opening therethrough communicating with said cavity and registering with the said tubular latching member, said valve being proportioned for reception in said socket member in axial thrusting engagement with said valve member to unseat the latter, and to cause retractive movement of said latching member.

References Cited in the file of this patent
UNITED STATES PATENTS

| | | |
|---|---|---|
| 2,665,928 | Omon et al. | Jan. 12, 1954 |
| 2,728,590 | Macgregor | Dec. 27, 1955 |
| 2,733,079 | Worlidge | Jan. 31, 1956 |